United States Patent [19]
Oshima

[11] Patent Number: 5,478,473
[45] Date of Patent: Dec. 26, 1995

[54] METHOD AND DEVICE FOR PURIFYING WATER

[75] Inventor: Katsutoshi Oshima, Tokyo, Japan

[73] Assignee: Zaidan Hojin Nanyo Kyokai, Tokyo, Japan

[21] Appl. No.: 195,696

[22] Filed: Feb. 16, 1994

[30] Foreign Application Priority Data

Apr. 9, 1993 [JP] Japan ................................ 5-107306

[51] Int. Cl.$^6$ .......................... C02F 3/06; B01D 35/05
[52] U.S. Cl. ..................... 210/617; 210/618; 210/636; 210/747; 210/150; 210/170; 210/242.1
[58] Field of Search ................................ 210/615, 618, 210/242.2, 617, 747, 150, 151, 242.1, 170, 631

[56] References Cited

U.S. PATENT DOCUMENTS

| | | | |
|---|---|---|---|
| 3,402,817 | 9/1968 | Dovel | 210/242.1 |
| 3,852,378 | 12/1974 | Guida | 210/242.2 |
| 3,928,190 | 12/1975 | Beébin | 210/618 |
| 4,454,038 | 6/1984 | Shimodaira et al. | 210/150 |
| 4,582,609 | 4/1986 | Hunter, III et al. | 210/747 |
| 4,725,367 | 2/1988 | McKim et al. | 210/275 |
| 4,992,174 | 2/1991 | Caplan et al. | 210/610 |
| 5,006,251 | 4/1991 | Takeishi et al. | 210/618 |
| 5,080,782 | 1/1992 | Caplan et al. | 210/151 |
| 5,122,287 | 6/1992 | Hsiung | 210/275 |
| 5,228,998 | 7/1993 | DiClemente et al. | 210/610 |
| 5,314,619 | 5/1994 | Runyon | 210/747 |

FOREIGN PATENT DOCUMENTS

4284895 9/1992 Japan ................................ 210/615

Primary Examiner—Peter A. Hruskoci
Assistant Examiner—Theodore M. Green
Attorney, Agent, or Firm—Marshall & Melhorn

[57] ABSTRACT

A body of water is purified by filtering its water both physically and biologically through a filter layer preferably consisting of a floating filter layer, and by contacting aerobic bacterial flocks, which are formed in the filter layer in time, with the mud in the river bottom typically placed in an anaerobic condition so that denitrification of the river water by denitrifying bacteria may be promoted. Thus, the present invention assists the natural biological purification process, and can improve The transparency of the water, reduce BOD and COD, promote denitrification to a sufficient extent to make the water liveable for fish, and trap low concentration toxic chemical substances such as insecticides and herbicides into the bacterial flocks.

18 Claims, 2 Drawing Sheets

METHOD AND DEVICE FOR PURIFYING WATER

TECHNICAL FIELD

The present invention relates to a method and device for purifying or cleaning water, and in particular to a method and device for purifying the water of rivers and lakes by providing an environment suitable for bacteria which can convert contaminants in the water into forms suitable to be assimilated into natural biological processes.

BACKGROUND OF THE INVENTION

In recent years, sewage from homes, waste water from manufacturing plants, chemical residues from farms, and feed residues from fish farms have polluted water in rivers, lakes, sea and other bodies of water, and such pollution of water can be measured by the increase in BOD (biochemical oxygen demand), COD (chemical oxygen demand) and other values. When water is polluted beyond a certain extent, underwater plants and animals are destroyed, and when such polluted water is used as a water resource for human consumption, living environments of humans are also destroyed. Therefore, it is now necessary to purify waste water from various sources on the one hand and to purify large bodies of water into which polluted water has mixed in.

As a method for purifying large bodies of contaminated water and waste water from various sources, it is known to form a processing layer by using gravel, a honeycomb structure or anthracite, and allow contaminants heavier than water to be caught in the processing layer. However, according to this method of purifying water, because a fixed filtering or other processing layer is not effective in carrying air and bacteria therein, it has not been possible to achieve a sufficient water purifying effect. In short, this process is not efficient enough to purify a large body of water in an economically feasible fashion. Additionally, to prevent the clogging of such a processing layer due to deposition of foreign matters, it is necessary to backwash the processing layer at regular intervals, and it is therefore not possible to carry out the process of purifying water as a truly continuous process.

Furthermore, because the processing layer is fixed, it is necessary to supply an excessive amount of air to the processing layer for bacteria effective in purifying water to grow, and the resulting increase in power consumption increases the operating cost of the water purifying process. This method is also not efficient enough to be effective in purifying large bodies of water because its capability to reduce BOD and COD is again quite limited.

The inventor has discovered that rivers and lakes which are known to have a natural capability to purify themselves can purify the water in relatively short time only when the extent of contamination is within certain limit, and will lose such a capability when the extent of contamination exceeds a certain limit. For instance, in severely contaminated rivers and lakes, the bottom is covered by mud which is in an anaerobic condition, and this severely restricts the natural or biological water purifying process. Therefore, in order to purifying large body of water, any attempt to simply purify the water either physically or biologically is inadequate in most cases, and it is necessary to take a measure which will promote the natural biological water purifying process. In other words, it is necessary to ultimately rely on the natural biological process to purify a large body of water.

BRIEF SUMMARY OF THE INVENTION

In view of such problems of the prior art and the recognition by the inventor, a primary object of the present invention is to provide a method and device for purifying water which are capable of purifying a large body of water by promoting the natural biological water purifying process.

A second object of the present invention is to provide a method and device for purifying water which is highly efficient and consumes very little energy.

A third object of the present invention is to provide a method and device for purifying water which can purify a large body of water as a continuous process.

According to the present invention, these and other objects can be accomplished by providing a device for purifying water of a body of water such as a river, a lake or sea, comprising: a carrier provided adjacent to the body of water and incorporating a processing chamber therein; a filtering layer provided inside the processing chamber and consisting of an aggregate of flakes, granules, powders or fibers; means for passing water from the body of water through the filtering layer; backwashing means for separating flocks of bacteria which grow in the filtering layer in time; and releasing means for releasing the flocks of bacteria into the body of water, and a method for purifying water of a body of water such as a river, a lake or sea, comprising the steps of: passing water from the body of water through a filtering layer consisting of an aggregate of flakes, granules, powders or fibers; backwashing the filtering layer occasionally for separating flocks of bacteria which grow in the filtering layer in time; and releasing the separated flocks of bacteria into the body of water.

Thus, according to the present invention, the body of water is purified by filtering its water both physically and biologically through a filter layer preferably consisting of a floating filter layer, and by contacting the aerobic bacterial flocks with the mud in the river bottom typically placed in an anaerobic condition so that denitrification of the river water by denitrifying bacteria may be promoted. Thus, the present invention assists the natural biological purification process, and can improve the transparency of the water, reduce BOD and COD, promote denitrification to a sufficient extent to make the water liveable for fish, and trap low concentration toxic chemical substances such as insecticides and herbicides into bacterial flocks.

To increase the efficiency of the water purifying process according to the present invention, it is more desirable to release the flocks of bacterial flocks to as widespread an area as possible. To that end, the outlet for releasing the bacterial flocks may be distributed over a certain length or area, or, alternatively, the outlet for releasing the bacterial flocks may be made moveable. If the water to be processed is flowing, a fixed water purifying device according to the present invention may be adequate. If necessary, the device of the present invention may be carried by a boat which may be moveable either by itself or by external propelling means.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
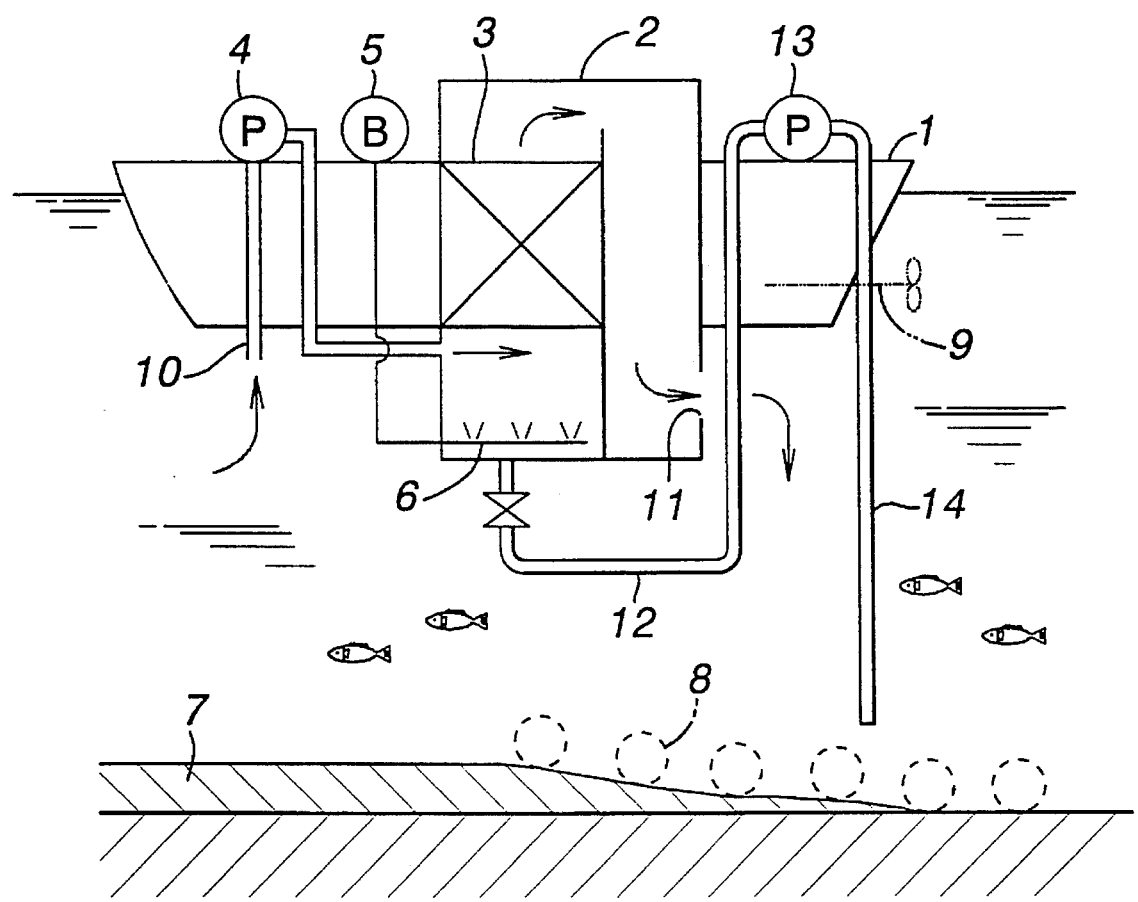
FIG. 1 is a side view of a boat carrying a device of the present invention.

FIG. 1 is a simplified sectional side view showing the structure of a boat 1 constructed according to the present invention. This boat 1 is provided with powered propelling means, and can move about the river at will. This boat 1 is centrally provided with a processing chamber 2 receiving therein a floating filter layer 3 of approximately 2.5 m in height and consisting of foamed polypropylene particles having a range of diameter between 5 to 10 mm.

This processing chamber 2 includes an inverted U-shaped water passage having one of its lower ends communicated with the river water via an opening 11 and its other lower end communicated with the upper surface of the floating filter layer 3. The boat 1 is further provided with a pump 4 for feeding the river water drawn from a conduit 10 into the processing chamber 2 from the lower surface of the floating filter layer 3.

The boat 1 is additionally provided with a blower 5 for ejecting air from nozzles 6 provided under the filter layer 3 for agitating the filter layer 3 as required.

Thus, the water delivered by the pump 4 to the lower surface of the floating filter layer 3 is passed upward through the filter layer 3, and is ejected back into the river or the lake from the opening 11. The boat 1 may be either towed by another powered tug boat or the like, or provided with a propeller 9 to be able to move about by itself.

According to this water purifying device, the river water is passed upward through the floating filter layer 3, and is returned to the river. Inside the floating filter layer 3, a biological process is carried out, and contaminants are converted into less desirable substances by suitable bacteria with the result that BOD and COD are reduced as the responsible substances are assimilated into bacteria. The bacteria form viscous or sticky flocks which conveniently trap solid substances (SS) and chemical substances of extremely small concentrations. Thus, highly stable flocks of aerobic bacteria are formed in the floating filter layer 3. By adding a small amount of a flocculating agent, such as aluminum sulfate by 1 to 3 mg per liter, the SS and phosphorus in the water can be more efficiently trapped, and formation of flocks of aerobic bacteria can be carried out in a more efficient manner.

Thus, the biological filtering action through the bacterial membrane as well as the physical filtering action is utilized for purifying the water under normal condition. When a sufficient amount of flocks of aerobic bacteria are formed in the floating filter layer 3, the blower 5 is activated, and the floating filter layer 3 is agitated by air. As a result, the flocks of aerobic bacteria are dislodged and separated from the floating filter layer 3. After separation, the flocks of aerobic material 8 are towards the bottom of the processing chamber 2 and are released to the bottom of the river via conduits 12 and 14 by activating a pump 13. According to this embodiment, air was used for agitating the floating filter layer 3, but it is also possible to use water to backwash the filter layer 3.

If the water to be treated is contaminated to such an extent that the transparency is no more than 30 cm and sunlight cannot reach the river bottom, the river bed rich in organic substances tends to be kept in anaerobic condition, and the natural biological process is riot active enough to reduce the contamination of the river water. However, when water purified by the device of the present invention and containing oxygen dissolved therein is introduced into the bottom of the river, the transparency of the river water will quickly improve to the level of one meter or better. As a result, sunlight can reach the river bottom, and this will promote the growth of algae and other underwater plants having the capability to purify the water. Furthermore, the contacting the aerobic bacterial flocks 8 with the anaerobic mud and sludge 7 in the river bottom will promote the denitrification by nitrifying bacteria, and this will further purify the water.

EXAMPLE 1

Table 1 compares the qualities of the original water and the processed water when the device of the present invention is applied to a river into which a substantial amount of home sewage flows. In this example, the flow rare of the water to be processed was 2.5 m/h, and the contact time in the floating filter layer 3 was 60 minutes. The backwashing was carried out once a day for 15 minutes by using air by the amount of 0.7 $Nm^3$/min.

TABLE 1

|  | original water | processed water |
| --- | --- | --- |
| BOD (mg/liter) | 32.6 | 3.6 |
| COD (mg/liter) | 40.5 | 8.5 |
| SS (mg/liter) | 18.2 | 3.2 |
| T-N (mg/liter) | 12.4 | 9.8 |
| T-P (mg/liter) | 1.6 | 0.3 |
| transparency (cm) | 19 | 100 |
| SS at backwash (mg/liter) | — | 1800 |
| flock dia. at backwash (mm) | — | 5 to 8 |

EXAMPLE 2

Table 2 shows the case in which the flow rate of the water to be processed was increased to 5 m/h, and the contact time in the floating filter layer 3 was reduced to 30 minutes. Otherwise, the conditions are identical to those of the first example.

TABLE 2

|  | original water | processed water |
| --- | --- | --- |
| BOD (mg/liter) | 31.4 | 4.0 |
| COD (mg/liter) | 38.7 | 9.8 |
| SS (mg/liter) | 17.8 | 3.6 |
| T-N (mg/liter) | 11.8 | 9.6 |
| T-P (mg/liter) | 1.4 | 0.2 |
| transparency (cm) | 20 | 100 |
| SS at backwash (mg/liter) | — | 2900 |
| flock dia. at backwash (mm) | — | 5 to 8 |

EXAMPLE 3

The device of the present invention was applied to a river which was relatively free from home sewage and had a substantial growth of algae. The backwashing was carried out once a day by using air. The water to be processed was flowed at the rate of 5 m/h, and the contact time was 30 minutes. The conditions are otherwise identical to those of Examples 1 and 2.

TABLE 3

|  | original water | processed water |
| --- | --- | --- |
| BOD (mg/liter) | 12.4 | 3.4 |
| COD (mg/liter) | 16.2 | 7.3 |
| SS (mg/liter) | 21.6 | 3.2 |

TABLE 3-continued

|  | original water | processed water |
| --- | --- | --- |
| T-N (mg/liter) | 6.3 | 5.6 |
| T-P (mg/liter) | 0.93 | 0.21 |
| transparency (cm) | 22 | 100 |
| SS at backwash (mg/liter) | — | 2600 |
| flock dia. at backwash (mm) | — | 3 to 7 |

When the aerobic bacterial flocks obtained in Examples 1 and 2 are brought into contact with the mud layer 7 in the river bottom, the depth of the mud layer 7 was reduced to one half of the original depth. Furthermore, the mud layer 7 was more solidified, and the nitric concentration in the water was reduced to one fifth of the original concentration. This indicates that $NO_3$—N was converted into nitrogen gas by nitrifying bacteria, and released to the atmosphere.

Figure 2:
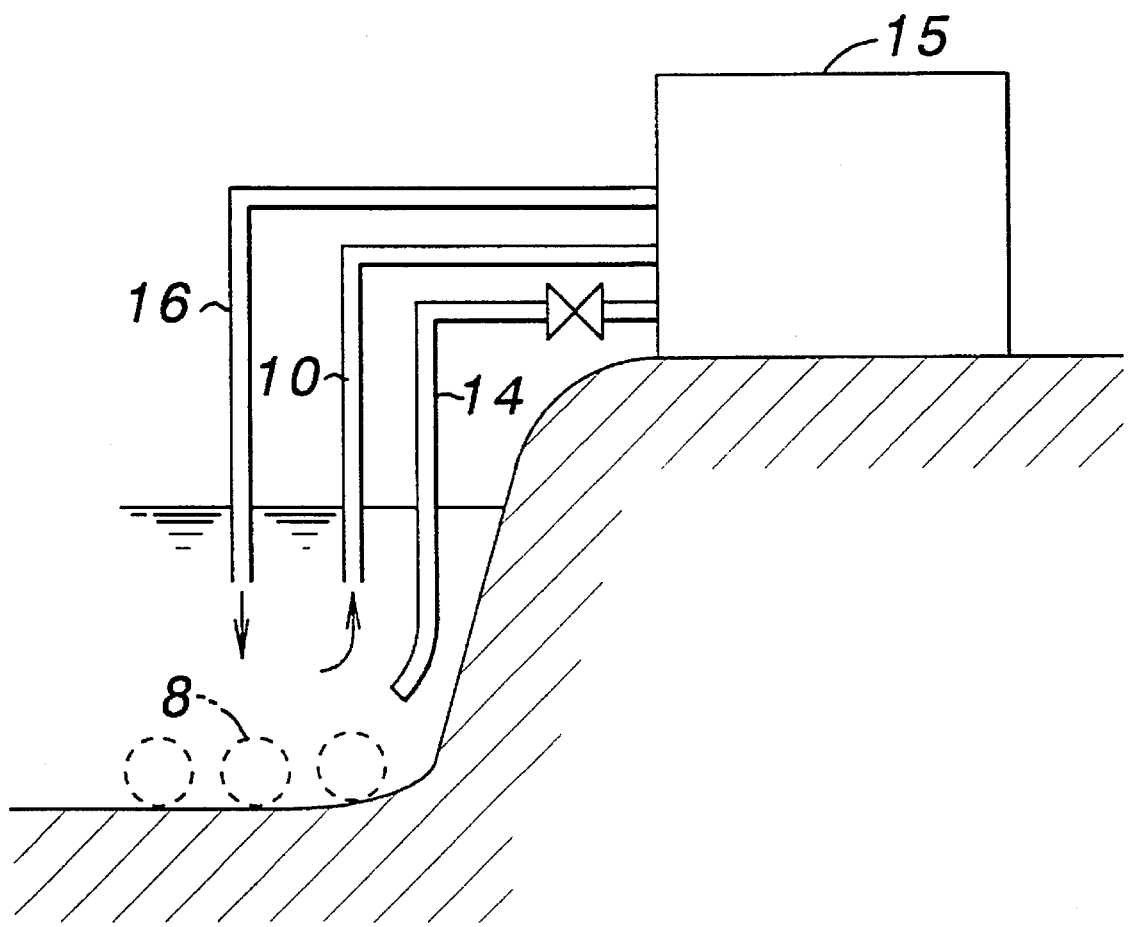
FIG. 2 is a similar view showing a second embodiment of the present invention in which the water purifying device according to the present invention is provided in a building constructed near a body of water to be processed.

FIG. 2 shows a second embodiment of the present invention. In this embodiment, instead of using a boat, a processing chamber is defined in a building 15 built on the bank of a river or on the shore of a lake. The structure of the processing chamber is identical to the one illustrated in FIG. 1, and is therefore not shown in FIG. 2. Similarly, the river water is drawn by a pump not shown in the drawing via an inlet pipe 10, and after being processed in the processing chamber, is released into the river via a conduit 16. Again, the floating filter layer is regularly agitated either by air or water, and the separated aerobic bacterial flocks 8 are released to the bottom of the river.

This embodiment is particularly advantageous when the water is flowing to some extent because the aerobic bacterial flocks 8 can be readily spread into a relatively wide area for improved water purifying efficiency. If desired, the conduit 14 may contain a number of branch conduits distributed along the width of the river or may be made moveable along the width of the river so that the aerobic bacterial flocks 8 can be spread into a relatively wide area for improved water purifying efficiency.

In the above description, only rivers and lakes were mentioned as examples of large bodies of water, but it is obvious to a person skilled in the art that the present invention can be applied to other sorts of bodies of water such as ponds marshes, seas, water reservoirs, canals, water ducts, etc. The carrier of the processing chamber can be either stationary or mobile, but using a boat, either self-propelled or propelled by other means, is more advantageous in covering a wide area for improved efficiency. It is also possible to move the device of the present invention along the bank of a river or the shore of a lake by a fall or other means. In the above embodiments, the water to be processed was passed upward through the filter layer 3, but can also be passed downward through the filter layer 3.

The material far the floating filter layer 3 is not limited by the example given above but may consist of other substances which may consist of flakes, granules, powders, fibers and other preferably irregular pieces having an apparent density preferably similar to or less than the water to be processed. Regarding the possible substances for such a filtering layer and other aspects of floating filter layers, reference is made to U.S. Pat. No. 4,115,266 issued Sep. 19, 1978 to Ohshima, and the contents of this prior patent should be incorporated in this application by reference. Generally speaking, relatively lighter materials are desirable as filter materials as they can freely move about in the filter layer, but heavier filter materials can be also used as long as a required filtering action can be achieved, and bacterial flocks can be separated therefrom.

Thus, according to the present invention, the river water is purified by filtering it both physically and biologically through a floating filter layer, and by contacting aerobic bacterial flocks with the mud in the river bottom placed in an anaerobic condition so that denitrification of the river water by denitrifying bacteria may be promoted. Thus, the present invention assists the natural biological purification process, and can improve the transparency of the water, reduce BOD and COD, promote denitrification to a sufficient extent to make the water suitable for fish to live in, and trap low concentration toxic chemical substances such as insecticides and herbicides into bacterial flocks. Toxic substances trapped in the bacterial flocks are eventually decomposed into less harmful forms, and phosphorus which may be trapped into the bacterial flocks is converted into nutrients for algae and underwater plants.

More importantly, the aerobic bacterial flocks cause the river bottom to be covered by aerobic bacteria and make it into a ground suitable for the growth of such small organisms such as rotatoria which feed fish. Thus, a food chain is created in which the water is purified possible locally to a certain extent, an aerobic environment is created, small organisms, plants and algae are grown, and fish feed on such organisms. In short, the present invention is effective in restoring the natural food chain which simultaneously involves purification of water.

Although the present invention has been described in terms of specific embodiments thereof, it is possible to modify and alter details thereof without departing from the spirit of the present invention.

What we claim is:

1. A device for purifying water in a natural body of water including a river, a lake or sea, said device comprising:

a carrier provided adjacent to said body of water and incorporating a processing chamber therein;

a floating filtering layer provided inside said processing chamber with aerobic bacteria provided in said filtering layer to facilitate the growth of flocks of aerobic bacteria in said filtering layer;

means for passing water from said body of water through said filtering layer in said processing chamber to both physically and biologically filter contaminants from the water;

a first return means formed in the processing chamber for returning said clean filtered water from said processing chamber to said body of water;

means for periodically separating flocks of aerobic bacteria from said filtering layer in said processing chamber; and a second return means connected to the processing chamber for transporting said flocks of aerobic bacteria, upon separation from said filtering layer, from said processing chamber to said body of water through a conduit using a pump to provide additional purification by contacting anaerobic material in said body of water.

2. A device according to claim 1, wherein said filtering layer consists of aggregate of flakes, granules, powders, or fibers of material having a density which is similar to or smaller than the density of the water to be processed.

3. A device according to claim 1, wherein said carrier is moveable to a different part of said body of water.

4. A device according to claim 1, wherein said floating filtering layer includes foamed polypropylene particles.

5. A device according to claim 4, wherein said foamed polypropylene particles have a diameter of 5 to 10 mm.

6. A device according to claim 1, wherein said processing chamber includes an inverted U-shaped water passage having an inlet end and an outlet end in communication with the body of water.

7. A device according to claim 1, wherein said means for periodically separating flocks of bacteria from said filtering layer includes a compressed air system directed at the filtering layer in the processing chamber of said carrier.

8. A device according to claim 1, wherein said means for periodically separating flocks of bacteria from said filtering layer includes a means for pumping water from an outlet end of said processing chamber through the filtering layer into an inlet end of said processing chamber.

9. A device according to claim 1, including a flocculating agent added to said floating filtering layer for forming flocks of bacteria.

10. A device according to claim 9, wherein said flocculating agent includes 1–3 mg per liter of aluminum sulfate.

11. A device according to claim 1, wherein said second return means for transporting said flocks of bacteria includes a moveable conduit.

12. A device according to claim 1, wherein said carrier includes a fixed housing on a bank of a river, and said means for releasing said flocks of bacteria includes a plurality of branch conduits for distribution of said flocks of bacteria.

13. A method for purifying water in a natural body of water including a river, a lake or sea, comprising the steps of:

positioning a floating filter layer in a processing chamber adjacent said body of water;

introducing and maintaining aerobic bacteria in the floating filter layer;

passing water from said body of water through an inlet in said processing chamber to the floating filtering layer;

physically filtering contaminants from the water by passing the water through the floating filter layer into an outlet in said processing chamber;

simultaneously biologically filtering contaminants by assimilation of the contaminants in the bacteria to form flocks of aerobic bacteria as the water passes through the floating filtering layer;

returning clean filtered water from the outlet in said processing chamber to said body of water;

periodically separating the flocks of aerobic bacteria from the floating filter layer in the processing chamber;

releasing the separated flocks of aerobic bacteria into said body of water; and contacting aerobic bacterial flocks with anaerobic material in said body of water for denitrification and decomposition.

14. A method according to claim 13, wherein maintaining aerobic bacteria in the floating filter layer includes adding a flocculating agent to the bacteria in the floating filter layer.

15. A method according to claim 13, including moving the processing chamber over the body of water during the physical and biological filtering of the water.

16. A method according to claim 13, wherein releasing the separated flocks of bacteria into said body of water includes distributing the flocks of aerobic bacteria to different locations in said body of water.

17. A method according to claim 13, wherein periodically separating the flocks of aerobic bacteria from the floating filter layer includes directing a stream of air at the floating filter layer.

18. A method according to claim 13, wherein periodically separating the flocks of aerobic bacteria from the floating filter layer includes directing water from the outlet of the processing chamber through the floating filter layer into the inlet of the processing chamber.

\* \* \* \* \*